(12) United States Patent
Low et al.

(10) Patent No.: US 8,820,779 B1
(45) Date of Patent: Sep. 2, 2014

(54) INFLATABLE AIRBAG ASSEMBLY WITH AN INTERNALLY MOUNTED INFLATOR

(71) Applicant: Autoliv ASP, Inc., Ogden, UT (US)

(72) Inventors: Jeffrey Eugene Low, Layton, UT (US); Kurt Lawrence Gammill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/843,350

(22) Filed: Mar. 15, 2013

(51) Int. Cl.
*B60R 21/232* (2011.01)

(52) U.S. Cl.
CPC ................................. *B60R 21/232* (2013.01)
USPC ...................................................... 280/728.2

(58) Field of Classification Search
USPC .......................................... 280/728.2, 730.2
See application file for complete search history.

(56) References Cited

U.S. PATENT DOCUMENTS

| | | | | |
|---|---|---|---|---|
| 5,899,486 | A * | 5/1999 | Ibe .............................. | 280/728.2 |
| 6,082,761 | A * | 7/2000 | Kato et al. .................. | 280/728.2 |
| 6,224,089 | B1 * | 5/2001 | Uchiyama et al. ......... | 280/730.2 |
| 7,677,595 | B2 * | 3/2010 | Dominissini et al. ...... | 280/728.2 |
| 7,976,055 | B2 * | 7/2011 | Son ............................ | 280/728.2 |
| 8,007,000 | B2 * | 8/2011 | Gammill et al. ........... | 280/730.2 |
| 2003/0178832 | A1 * | 9/2003 | Dominissini et al. ...... | 280/743.2 |
| 2006/0244244 | A1 * | 11/2006 | Blackburn ................. | 280/728.2 |
| 2011/0042923 | A1 * | 2/2011 | Hatfield et al. ............ | 280/730.2 |
| 2011/0049848 | A1 * | 3/2011 | Walston et al. ............ | 280/730.2 |
| 2011/0163521 | A1 * | 7/2011 | Gammill et al. ........... | 280/728.2 |
| 2012/0074673 | A1 * | 3/2012 | Henriksson et al. ....... | 280/728.2 |
| 2013/0221637 | A1 * | 8/2013 | Lewis et al. ................ | 280/728.2 |

* cited by examiner

*Primary Examiner* — Joseph M Rocca
*Assistant Examiner* — Robert A Coker
(74) *Attorney, Agent, or Firm* — Stoel Rives LLP

(57) ABSTRACT

An inflatable airbag assembly can include an inflatable curtain airbag and an inflator. In some arrangements, the inflatable curtain airbag may include an inflator housing region where the inflator may be at least partially disposed. In some arrangements, the inflatable airbag assembly may also include a mounting assembly that includes a coupling member tethered to a mounting member.

29 Claims, 10 Drawing Sheets

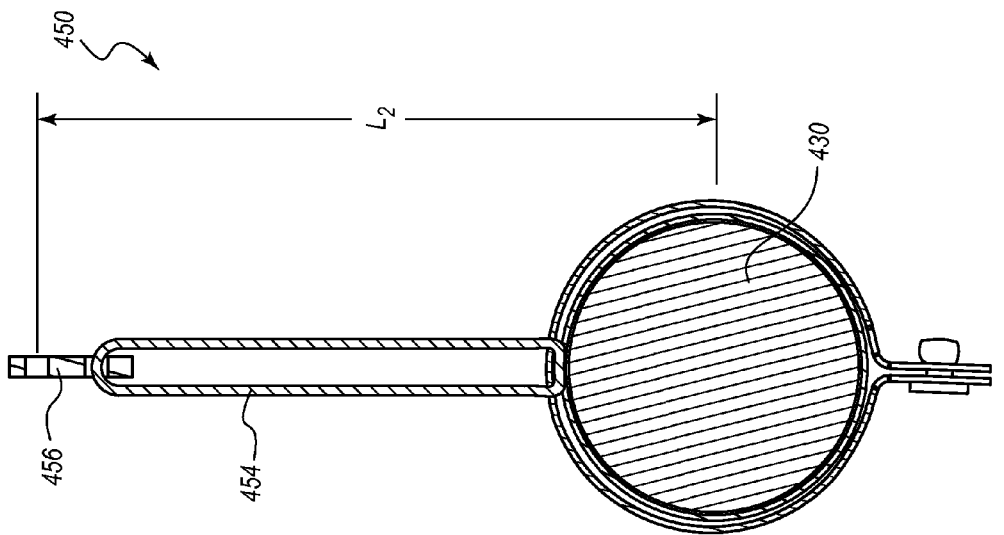
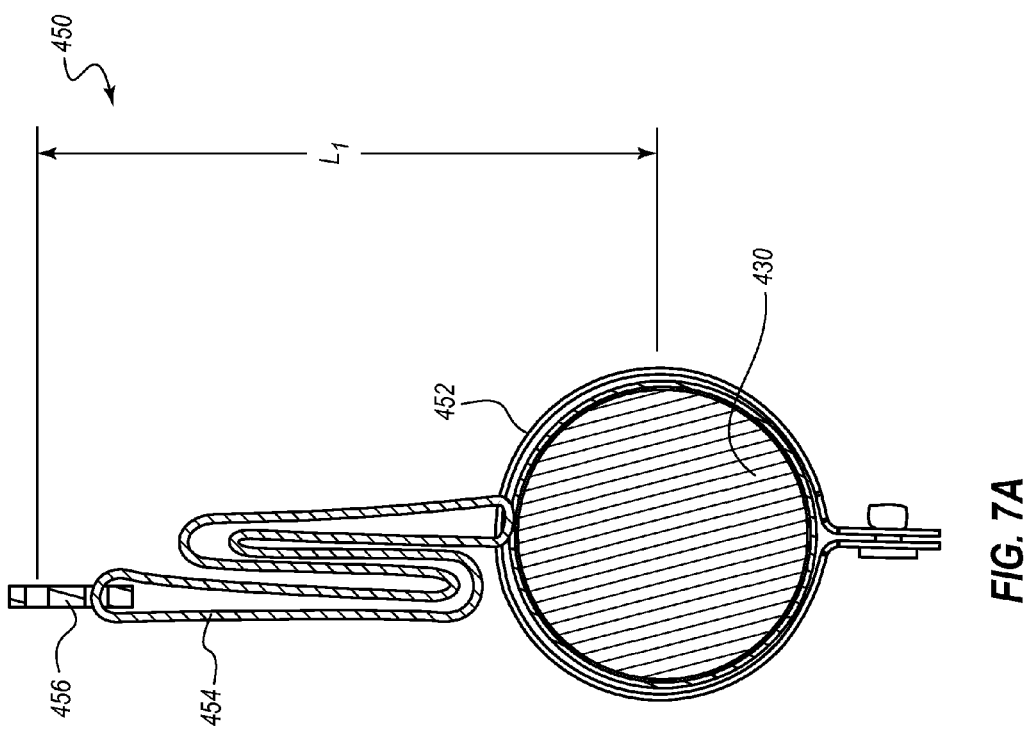

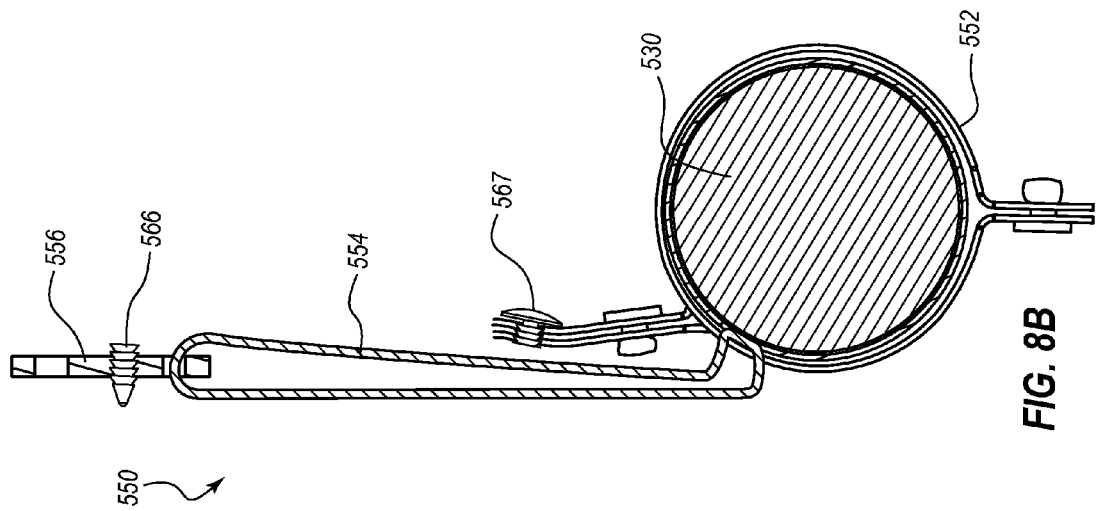
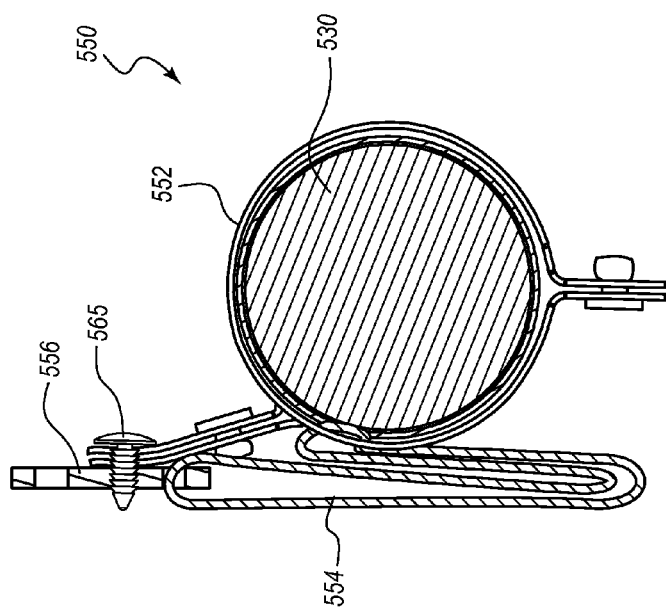
FIG. 8B
FIG. 8A

INFLATABLE AIRBAG ASSEMBLY WITH AN INTERNALLY MOUNTED INFLATOR

TECHNICAL FIELD

The present disclosure relates generally to the field of automotive protective systems. More specifically, the present disclosure relates to an inflatable airbag assembly with an internally mounted inflator.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 7A is a cross-sectional end view of an embodiment of a mounting assembly and inflator, wherein the mounting assembly is in a packaged configuration.

FIG. 7B is a cross-sectional end view of the mounting assembly and inflator of FIG. 7A, wherein the mounting assembly is in a deployed configuration.

FIG. 8A is a cross-sectional end view of another embodiment of a mounting assembly and inflator, wherein the mounting assembly is in a packaged configuration.

FIG. 8B is a cross-sectional end view of the mounting assembly and inflator of FIG. 8A, wherein the mounting assembly is in a deployed configuration.

DETAILED DESCRIPTION

Figure 1A:
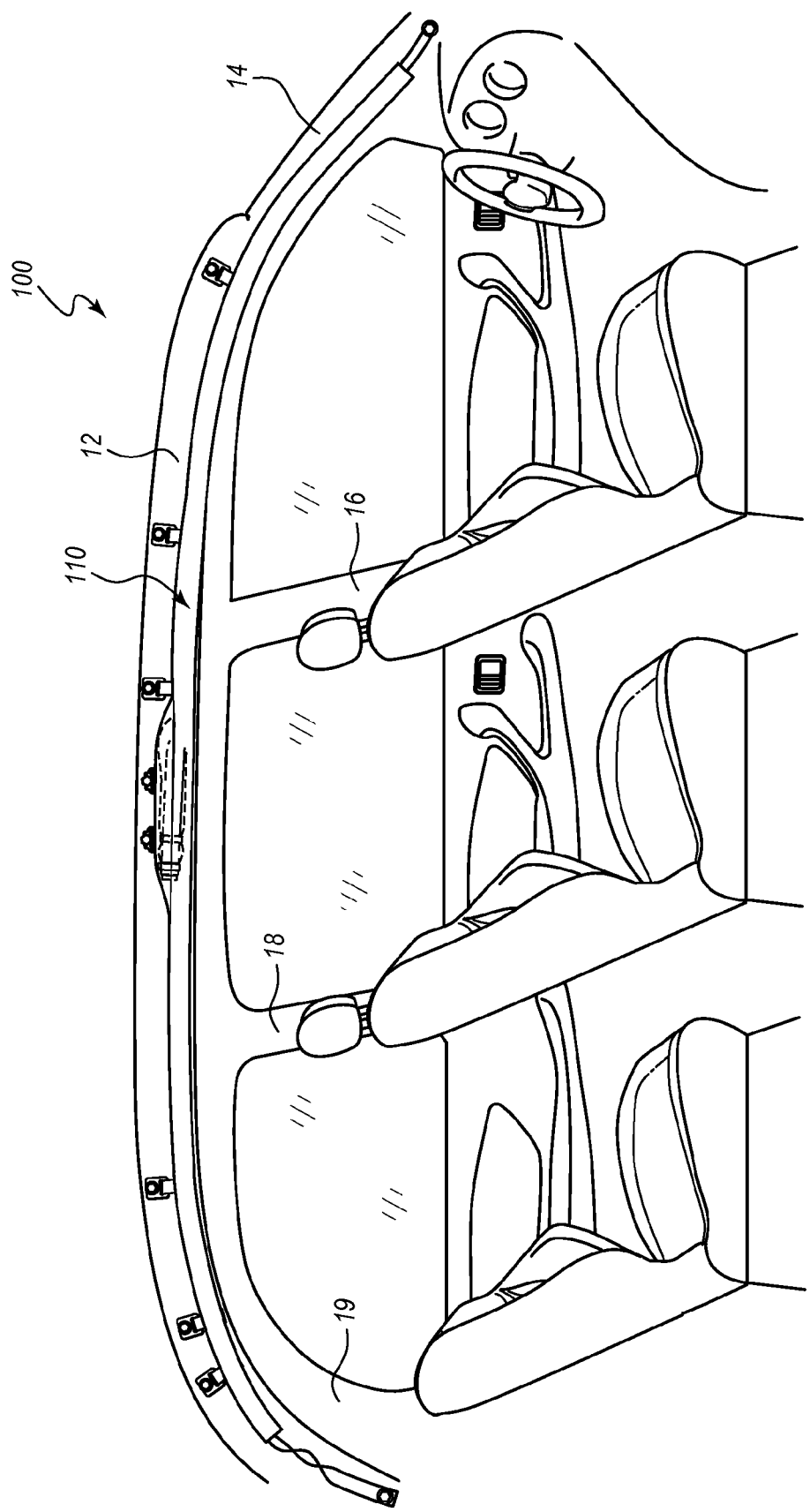
FIG. 1A is a perspective view of one embodiment of an inflatable airbag assembly, wherein an inflatable curtain airbag is in a packaged configuration.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other. The terms "abut" and "abutting" refer to items that are in direct physical contact with each other, although the items may not necessarily be attached together.

Inflatable airbag systems are widely used to minimize occupant injury in a collision scenario. Airbag modules or assemblies have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over event. Inflatable curtain airbags typically extend longitudinally within the vehicle and may be coupled to or next to the roof rail of the vehicle. Inflatable curtain airbags may expand in a collision scenario along the side of the vehicle between the vehicle passengers and the side structure of the vehicle. In a deployed state, an inflatable curtain airbag may cover at least a portion of the side windows of a vehicle. In some embodiments, inflatable curtain airbags may extend from an A-pillar to a C-pillar of the vehicle. In alternative embodiments, inflatable curtain airbags may extend from the A-pillar to a D-pillar of the vehicle.

Inflatable curtain airbags often comprise inflator throats or housing regions that protrude or otherwise extend beyond an outer perimeter seam of the airbag. In contrast, the disclosed inflatable curtain airbags comprise an inflator housing region that may be constrained within the body of the airbag, or inwardly of an outer perimeter seam, and may not have a protruding throat. Eliminating and/or minimizing the protruding throat may decrease manufacturing costs. For example, by eliminating and/or minimizing the protruding throat, the height of the inflatable curtain airbag may be shortened which increases the number of airbag cushions that can be fit across a loom of material. Additionally, eliminating and/or minimizing the protruding throat decreases the amount of material that needs to be trimmed from the airbag cushion during the manufacturing process.

FIG. 1A depicts a perspective view of an airbag assembly 100, wherein an inflatable curtain airbag 110 is in a packaged configuration and is mounted adjacent to a vehicle roof rail 12. Inflatable curtain airbag 110 comprises an inflator housing region in which an inflator is at least partially disposed. Airbag assembly 100 further comprises one or more mounting assemblies. The mounting assemblies may be used to couple inflatable curtain airbag 110 to vehicle roof rail 12. The mounting assemblies may also be used to couple the inflator within inflatable curtain airbag 110. In the depicted embodiment, inflatable curtain airbag 110 extends from an A-pillar 14, to a D-pillar 19. Inflatable curtain airbag 110 also extends past a B-pillar 16 and a C-pillar 18 such that in a deployed configuration, the inflatable curtain airbag 110 at least partially covers B-pillar 16 and C-pillar 18, as depicted in FIG. 1B.

Figure 1B:
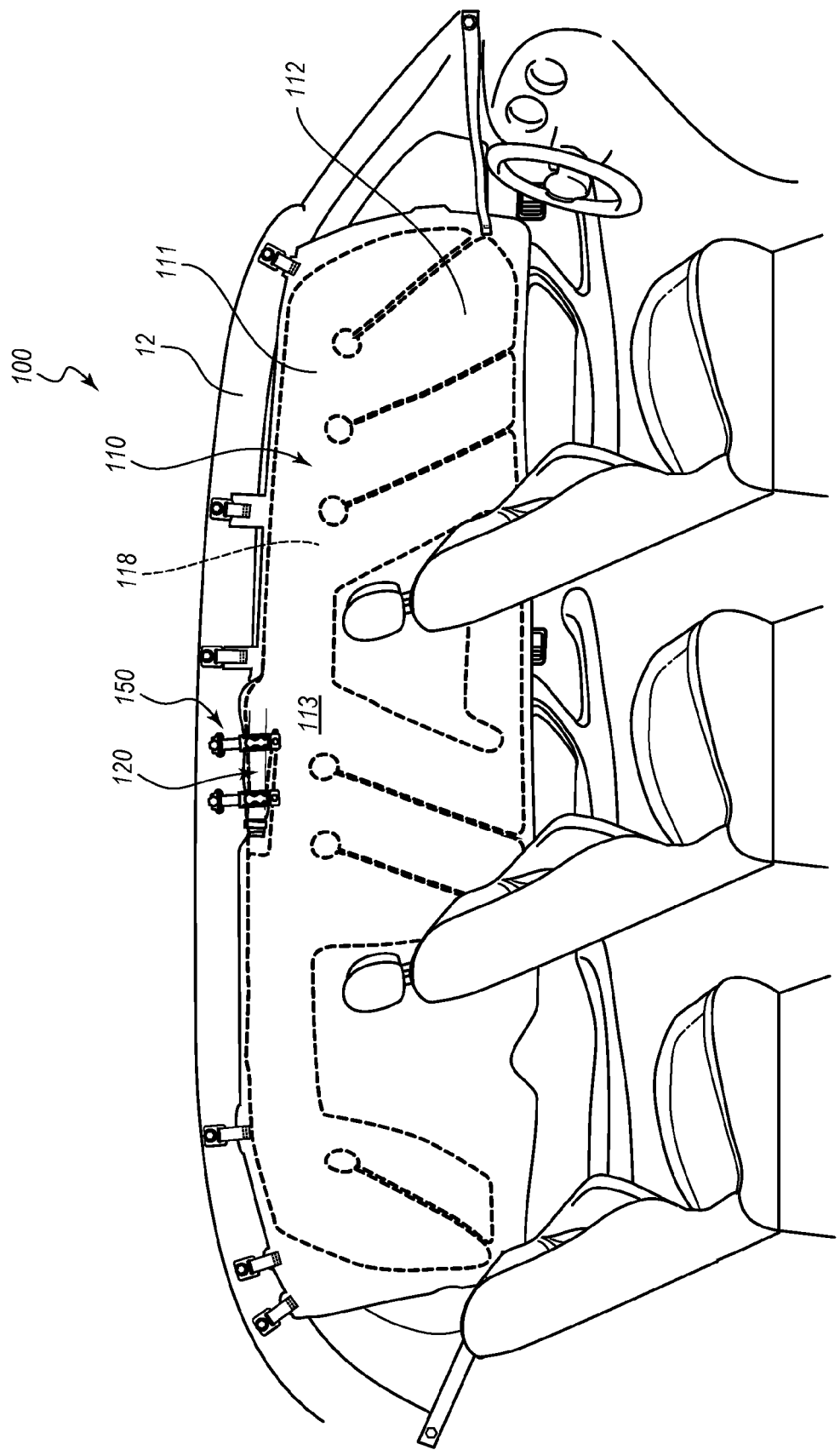
FIG. 1B is a perspective view of the inflatable airbag assembly of FIG. 1A, wherein the inflatable curtain airbag is in a deployed configuration.

FIG. 1B is a perspective view of airbag assembly 100, wherein inflatable curtain airbag 110 is depicted in a deployed configuration. As can be appreciated, inflatable curtain airbag 110 is configured to become inflated upon activation of one or more inflators such that inflatable curtain airbag 110 transitions from a packaged configuration to a deployed configuration. As shown in FIG. 1B, inflatable curtain airbag 110 may comprise an upper portion 111, a lower portion 112, a first face 113, a second face (not visible), and an inflator housing region 120. An inflator may be at least partially positioned within inflator housing region 120, which may be mounted to vehicle roof rail 12 via one or more mounting assemblies 150. The various faces of inflatable curtain airbag 110 define an interior inflatable void 118 which is in fluid communication with inflator housing region 120. Inflatable void 118 may also be divided into one or more inflation cells. In some embodiments, the various faces of inflatable curtain airbag 110 comprise panels of a woven nylon fabric that are coupled together at a seam.

Upper portion 111 of inflatable curtain airbag 110 is the portion of the curtain airbag that is closest to the headliner of a vehicle when the airbag is in a deployed state. Lower portion 112 is below upper portion 111 when inflatable curtain airbag 110 is in a deployed state, and is closest to a floor of the vehicle. The term "lower portion" is not necessarily limited to the portion of inflatable curtain airbag 110 that is below a horizontal medial plane of the inflatable curtain airbag 110, but may include less than half, more than half or exactly half of the bottom portion of inflatable curtain airbag 110. Likewise, the term "upper portion" is not necessarily limited to the portion of inflatable curtain airbag 110 that is above a horizontal medial plane of inflatable curtain airbag 110, but may include less than half, more than half or exactly half of the top portion of inflatable curtain airbag 110.

As will be appreciated by those skilled in the art, a variety of types and configurations of airbags can be utilized without departing from the scope and spirit of the present disclosure. For example, the size, shape, and proportions of the airbag may vary according to its use in different vehicles or different locations within a vehicle such that the airbag may comprise an inflatable curtain airbag, a rear passenger side airbag, a driver's airbag, a knee airbag, and/or a front passenger airbag. Also, the airbag may comprise any suitable material, such as, for example, a woven nylon fabric, which may be coated with a substance, such as silicone. Additionally, the airbag may be manufactured using a variety of techniques such as one piece weaving, cut and sew, or a combination of the two techniques. Further, the airbag may be manufactured using sealed or unsealed seams, wherein the seams are formed by stitching, adhesive, taping, radio frequency welding, heat sealing, or any other suitable technique or combination of techniques. The airbag may also comprise one or more vents, which may be configured as discreet vents or dynamic vents.

Figure 2:
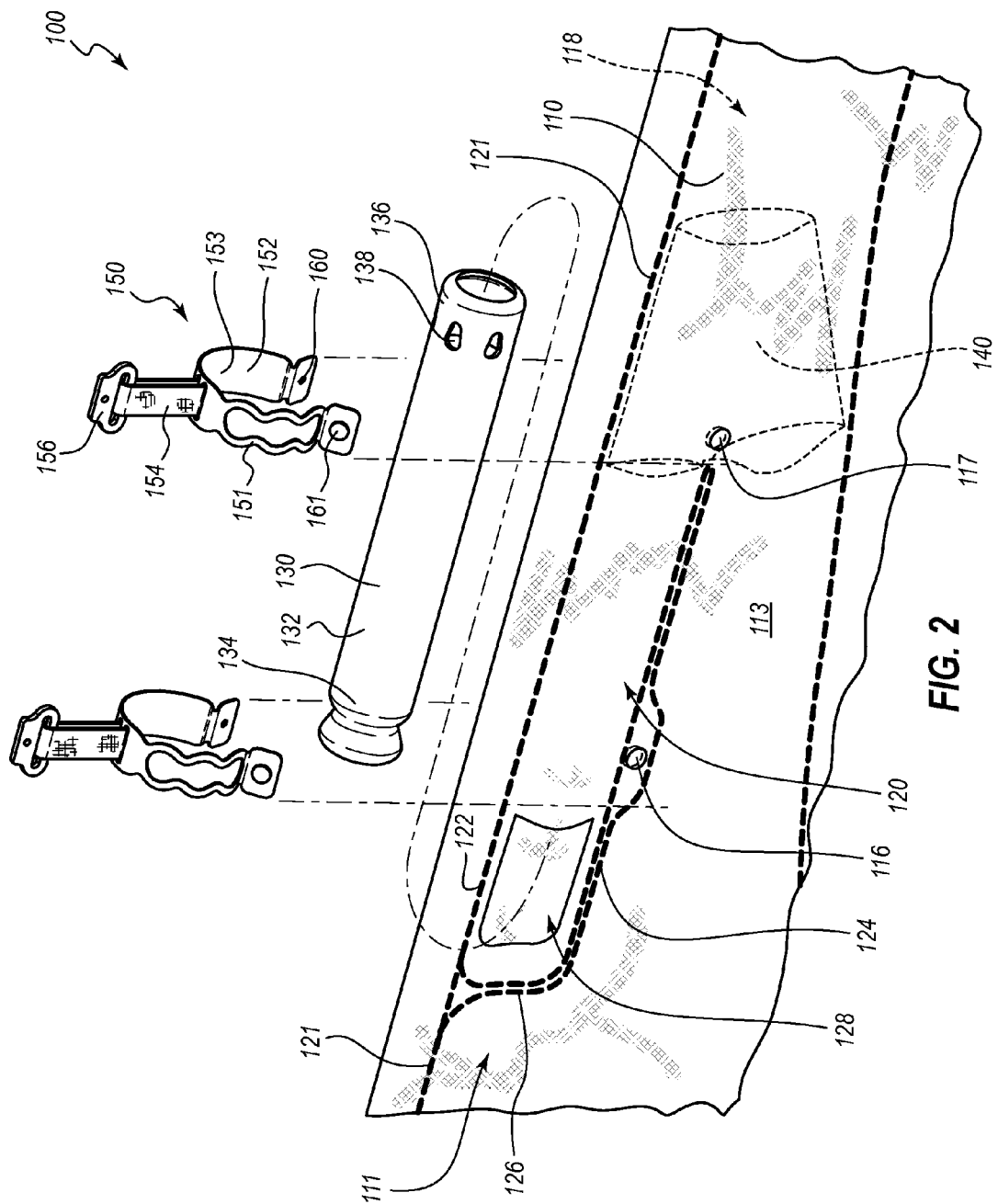
FIG. 2 is an exploded perspective view of a portion of the inflatable airbag assembly of FIGS. 1A-1B.

FIG. 2 is an exploded perspective view of a portion of inflatable airbag assembly 100 comprising inflatable curtain airbag 110, inflator 130, and mounting assembly 150. Inflatable curtain airbag 110 comprises an inflator housing region 120. In the depicted embodiment, inflator housing region 120 is located in upper portion 111 of inflatable curtain airbag 110, and comprises an inflator insert opening 128 that is in fluid communication with inflatable void 118.

Inflator housing region 120 may comprise a void between first face 113 and second face (not depicted) of inflatable airbag 110 that may be configured to receive inflator 130. Inflator housing region 120 may be disposed within the main body of inflatable curtain airbag 110. In some embodiments, inflator housing region 120 may be defined by an upper seam 122, a lower seam 124 and a side seam 126. One or more additional upper, lower and/or side seams may be used for added structure and support.

In some embodiments, inflator housing region 120 may be constrained to a location that is inwardly of an outer perimeter seam 121 of inflatable curtain airbag 110. The term "inwardly" refers to a direction that is towards a center portion of inflatable curtain airbag 110. The term "outwardly" refers to a direction that is away from the center portion of inflatable curtain airbag 110. When inflator 130 is at least partially positioned within inflator housing region 120, inflator 130 does not extend outwardly beyond outer perimeter seam 121. In the depicted embodiment, a portion of outer perimeter seam 121 also functions as the upper seam 122 of inflator housing region 120 such that inflator housing region 120 may be, in part, defined by outer perimeter seam 121. Inflatable curtain airbag 110 also does not comprise an airbag throat and/or inflator housing that protrudes outwardly beyond outer perimeter seam 121 of inflatable curtain airbag 110.

In the depicted embodiment, outer perimeter seam 121 is continuous at inflator housing region 120. A continuous outer perimeter seam 121 may provide strength and stability to inflatable curtain airbag 110. A continuous outer perimeter seam 121 may also aid in restraining inflatable curtain airbag 110 during deployment such that inflatable curtain airbag 110 is not twisted or rotated upon activation of inflator 130. In other embodiments, outer perimeter seam 121 is discontinuous at inflator housing region 120.

Inflator insert opening 128 provides a port through which inflator 130 can be extended and/or inserted. In some embodiments, inflator insert opening 128 comprises an aperture that extends through at least one of the faces (e.g., first face 113, or second face) of inflatable curtain airbag 110. In some embodiments, inflator insert opening 128 comprises an opening in the top of the inflatable curtain airbag 110, or an opening through a discontinuous portion of outer perimeter seam 121.

Although not depicted, inflator housing region 120 may comprise a reinforcing material and/or heat resistant material, such that inflatable curtain airbag 110 can be employed without a liner. Further, the location of the inflator housing region 120 may vary. For example, inflator housing region 120 may be located on a side portion of the inflatable curtain airbag 110, the bottom portion, or a middle portion.

As further depicted in FIG. 2, inflator 130 comprises a tubular body 132, a first end 134, and a second end 136. First end 134 may comprise a connection for electric or electronic communication with vehicle sensors. Second end 136 may be positioned within a liner 140, which may encompass vents 138. Upon activation, inflator 130 is configured to rapidly generate and/or release inflation gas through vents 138. The inflation gas rapidly inflates inflatable curtain airbag 110. Inflator 130 may be one of several types, such as pyrotechnic, stored gas, or a combination inflator and may comprise a single or multistage inflator.

In some embodiments, liner 140 can be positioned within inflatable void 118 of inflatable curtain airbag 110. Liner 140 may be configured to direct inflation gas in one or more predetermined directions. For example, liner 140 may be configured to direct inflation gas to pass from inflator 130 to the bottom and/or side portions of inflatable curtain airbag 110. A variety of types and configurations of liners 140 may be used. For example, liner 140 may comprise a heat resistant and/or reinforcing material such as a fibrous material, silicone, or any other suitable material. Further, liner 140 may comprise more than one layer of material. In some embodiments, liner 140 comprises the same woven nylon fabric as inflatable curtain airbag 110, and may be formed from a single piece of material.

Inflator 130, inflatable curtain airbag 110, and optionally, liner 140, may be coupled together via mounting assembly 150. Mounting assembly 150 may also be used to couple inflatable curtain airbag 110 to a vehicle roof rail or other vehicle structure. Mounting assembly 150 may comprise a coupling member 152, a tether 154, and a mounting member 156. In some embodiments, a plurality of mounting assemblies 150 is used. For example, the depicted embodiment comprises two mounting assemblies 150.

In certain embodiments, use of two or more mounting assemblies 150 may be advantageous. For example, two or more mounting assemblies 150 may minimize the amount of inflation gas that is leaked from within interior inflatable void 118. Two or more mounting assemblies 150 may also stabilize inflator 130 within inflatable curtain airbag 110. For example, a first mounting assembly 150 may couple first end 134 of inflator 130 to inflatable curtain airbag 110, while a second mounting assembly 150 may couple second end 136 of inflator 130 to inflatable curtain airbag 110. Two or more mounting assemblies 150 may also aid in restraining the inflatable curtain airbag 110 during deployment such that inflatable curtain airbag 110 is not twisted or rotated upon activation of inflator 130.

Coupling member 152 may couple inflator 130 to inflatable curtain airbag 110. For example, coupling member 152 may close or wrap around inflatable curtain airbag 110 after inflator 130 has been positioned at least partially within inflator housing region 120 such that inflator 130 and inflatable curtain airbag 110 are coupled together. Coupling member 152 may also provide the necessary pressure to seal inflatable curtain airbag 110 around inflator 130.

Various types of coupling members 152 may be used. In some embodiments, coupling member 152 comprises a clamp or like structure. In the depicted embodiment, for example, coupling member 152 comprises a clamp having a first arm 151 and a second arm 153. First arm 151 and second arm 153 may be coupled together via a fastener 161. Exemplary fasteners 161 include rivets, pins, screws, etc. In FIG. 2, fastener 161 is configured to extend from first arm 151 through an aperture 160 in second arm 153 thereby coupling first and second arms 151, 153 together. Further, as shown in FIG. 2, in some embodiments, a portion of coupling member 152, or fastener 161, may extend through an aperture (e.g., 116, 117) in inflatable curtain airbag 110. For example, the depicted inflatable curtain airbag 100 comprises a first aperture 116, and a second aperture 117, each of which may receive a fastener 161 of a mounting assembly 150. Thus coupling member 152 may close around inflatable curtain airbag 110. Other known clamping structures may also be used. For example, coupling member 152 may comprise a band-it clamp or other brackets or clips. In some embodiments, two or more different types of coupling members 152 may be used.

In some embodiments, coupling member 152 may be directly and rigidly attached to a vehicle structure. In other embodiments, coupling member 152 may be tethered to a separate mounting member 156 via tether 154. As depicted in FIG. 2, tether 154 extends between coupling member 152 and mounting member 156. Mounting member 156 may be configured to directly and/or rigidly attach to a vehicle structure. Thus, in some embodiments, inflator 130 is not rigidly attached to a vehicle structure. Further, in the depicted embodiment, inflator 130 does not comprise any mounting stems or other mounting structure that rigidly attaches inflator 130 to a vehicle structure.

Tether 154 may comprise one or more non-rigid materials and may allow inflator 130 and inflatable curtain airbag 110 to move or otherwise be displaceable during deployment. For example, in the packaged configuration, tether 154 may be rolled or folded, and inflator 130 and inflatable curtain airbag 110 may be disposed at a first position that is adjacent mounting member 156. During deployment, tether 154 extends and inflator 130 and inflatable curtain airbag 110 transition downwardly to a second position wherein inflator 130 and inflatable curtain airbag 110 are spaced away from mounting member 156. Inflator 130 and inflatable curtain airbag 110 are thus moveable between a first position and a second position, wherein inflator 130 is disposed at a distance that is closer to mounting member 156 in the first position than in the second position.

Figure 3A:
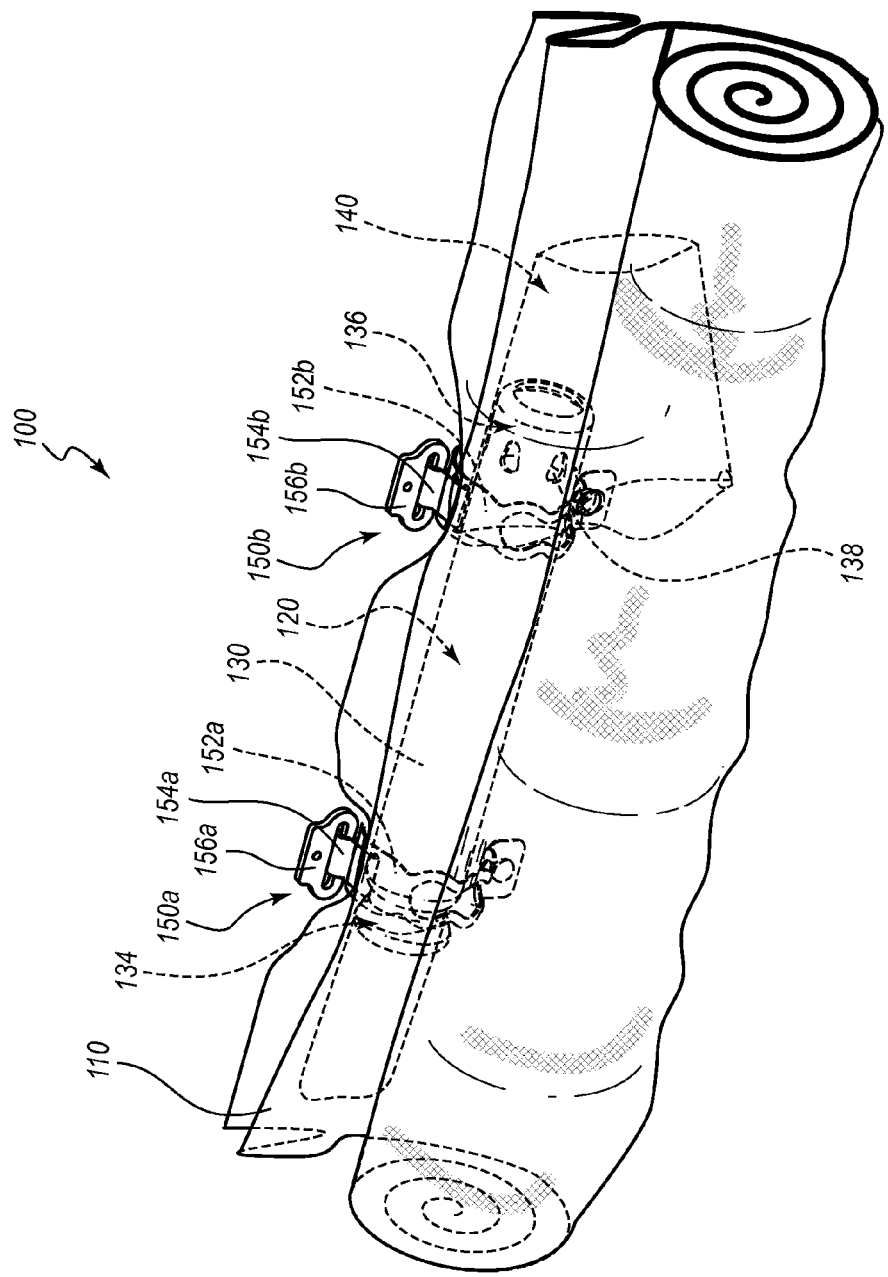
FIG. 3A is a cutaway perspective view of a portion of the inflatable airbag assembly of FIGS. 1A-1B, wherein the inflatable curtain airbag is in a packaged configuration.
Figure 3B:
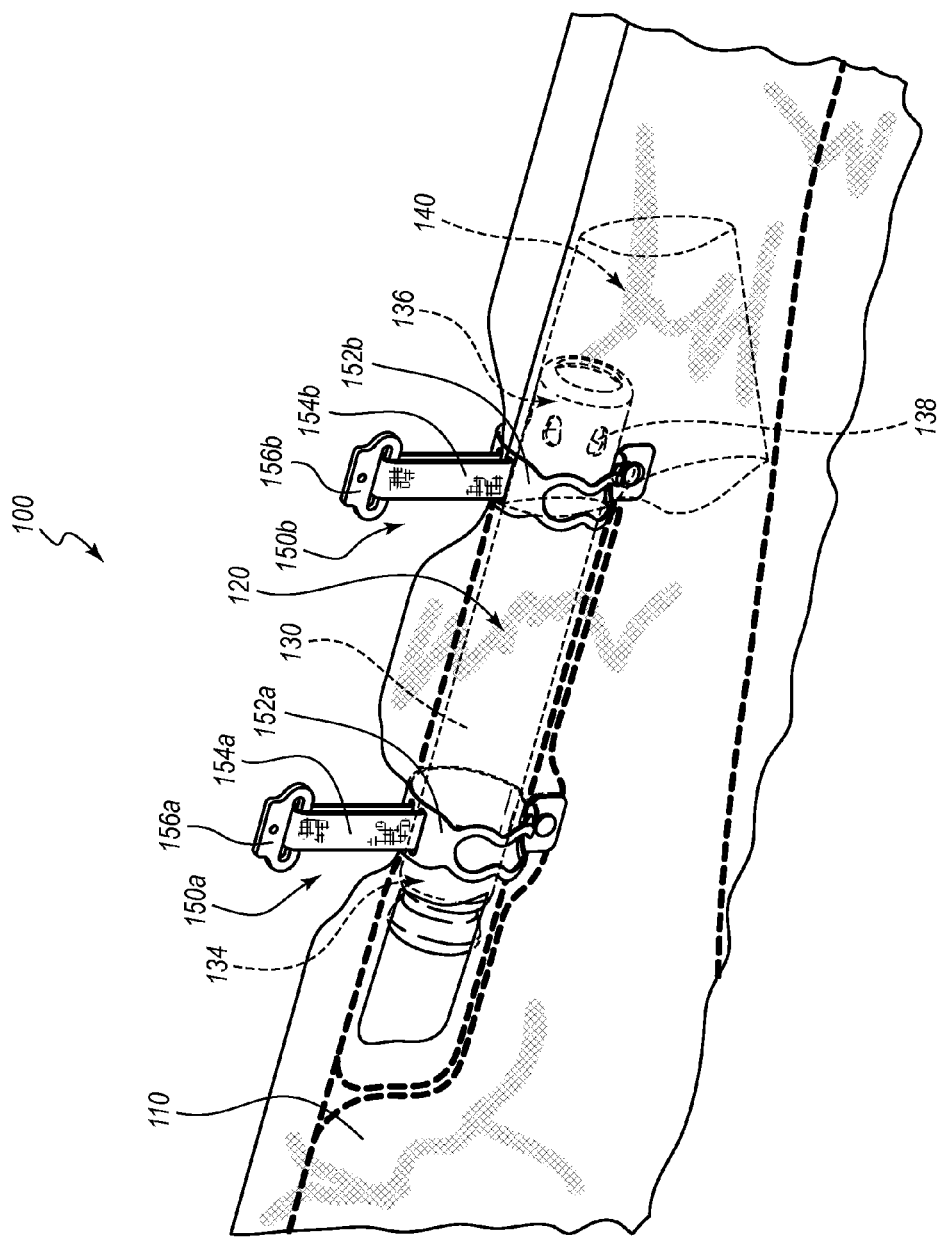
FIG. 3B is a cutaway perspective view of a portion of the inflatable airbag assembly of FIGS. 1A-1B, wherein the inflatable curtain airbag is in a deployed configuration.

FIGS. 3A-3B depict airbag assembly 100 in a packaged configuration (FIG. 3A) and a deployed configuration (FIG. 3B). In the depicted embodiment, inflator 130 is positioned at least partially within inflator housing region 120 of inflatable curtain airbag 110. Inflator 130 is also coupled to inflatable curtain airbag 110 via two mounting assemblies 150a 150b. Each mounting assembly 150a, 150b comprises coupling member 152a, 152b, tether 154a, 154b, and mounting member 156a, 156b, respectively. Mounting assembly 150a couples inflatable curtain airbag 110 to first end 134 of inflator 130 and mounting assembly 150b couples inflatable curtain airbag 110 to second end 136 of inflator 130. Mounting assemblies 150a, 150b may restrict inflatable curtain airbag 110 and inflator 130 from twisting and/or rotating during deployment. Mounting assemblies 150a, 150b may also control the movement of inflatable curtain airbag 110 and inflator 130 during the transition from the packaged configuration to the deployed configuration.

As depicted in FIG. 3A, inflatable curtain airbag 110 is rolled or folded in the packaged configuration. Tethers 154a, 154b may also be rolled or folded in the packaged configuration. Further, inflatable curtain airbag 110 is disposed in a first position that is adjacent to mounting members 156a, 156b when in the packaged configuration. In some embodiments, inflatable curtain airbag 110 is restrained in the first position until deployment.

As depicted in FIG. 3B, inflatable curtain airbag 110 is unrolled or otherwise extended in the deployed configuration. Tethers 154a, 154b are also extended in the deployed configuration. Inflatable curtain airbag 110 may thus transition from the first position wherein inflator 130 and inflatable curtain airbag 110 are adjacent to and/or abut mounting members 156a, 156b to a second position wherein inflator 130 and inflatable curtain airbag 110 are spaced from mounting members 156a, 156b during the deployment process. In the second position, the inflatable curtain airbag 110 may be disposed properly over one or more windows of a vehicle.

Figure 4:
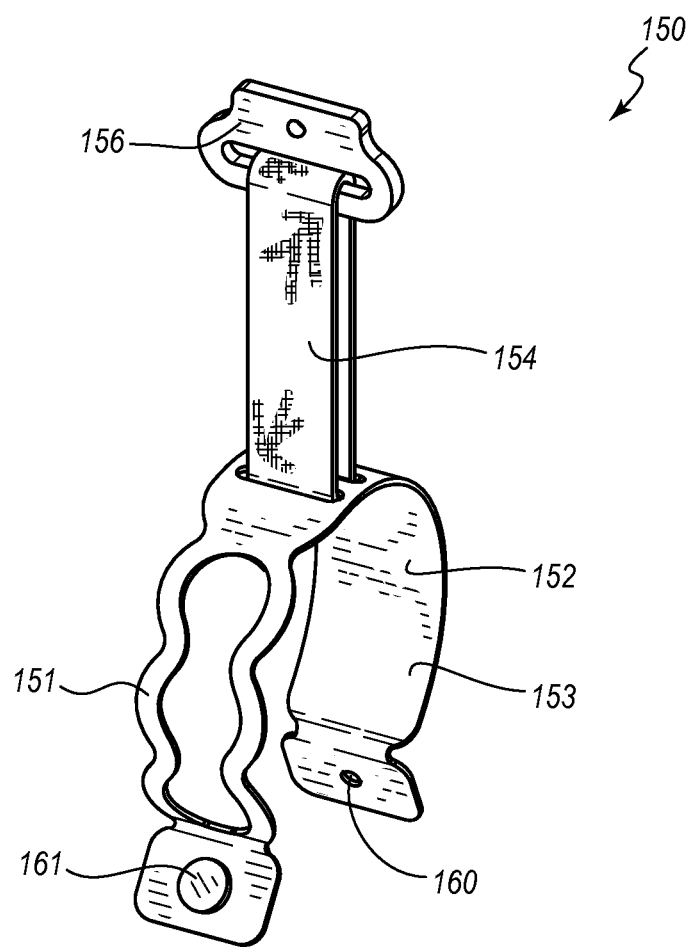
FIG. 4 is a perspective view of an embodiment of a mounting assembly, which may be a component of the inflatable airbag assembly of FIGS. 1A-1B.

FIG. 4 is a perspective view of an embodiment of a mounting assembly 150, which may be a component of the inflatable airbag assembly 100 of FIGS. 1A-1B. The depicted mounting assembly 150 comprises coupling member 152, tether 154, and mounting member 156. Tether 154 is coupled to and extends between coupling member 152 and mounting member 156. Coupling member 152 is thus moveable relative to mounting member 156 which may be directly and rigidly attached to a vehicle structure.

The exemplary coupling member 152 is also depicted comprising first arm 151 and second arm 153. As previously discussed, fastener 161 may extend from first arm 151 through aperture 160 in second arm 153 thereby coupling first arm 151 and second arm 153 together such that coupling member 152 may be closed.

Figure 5:
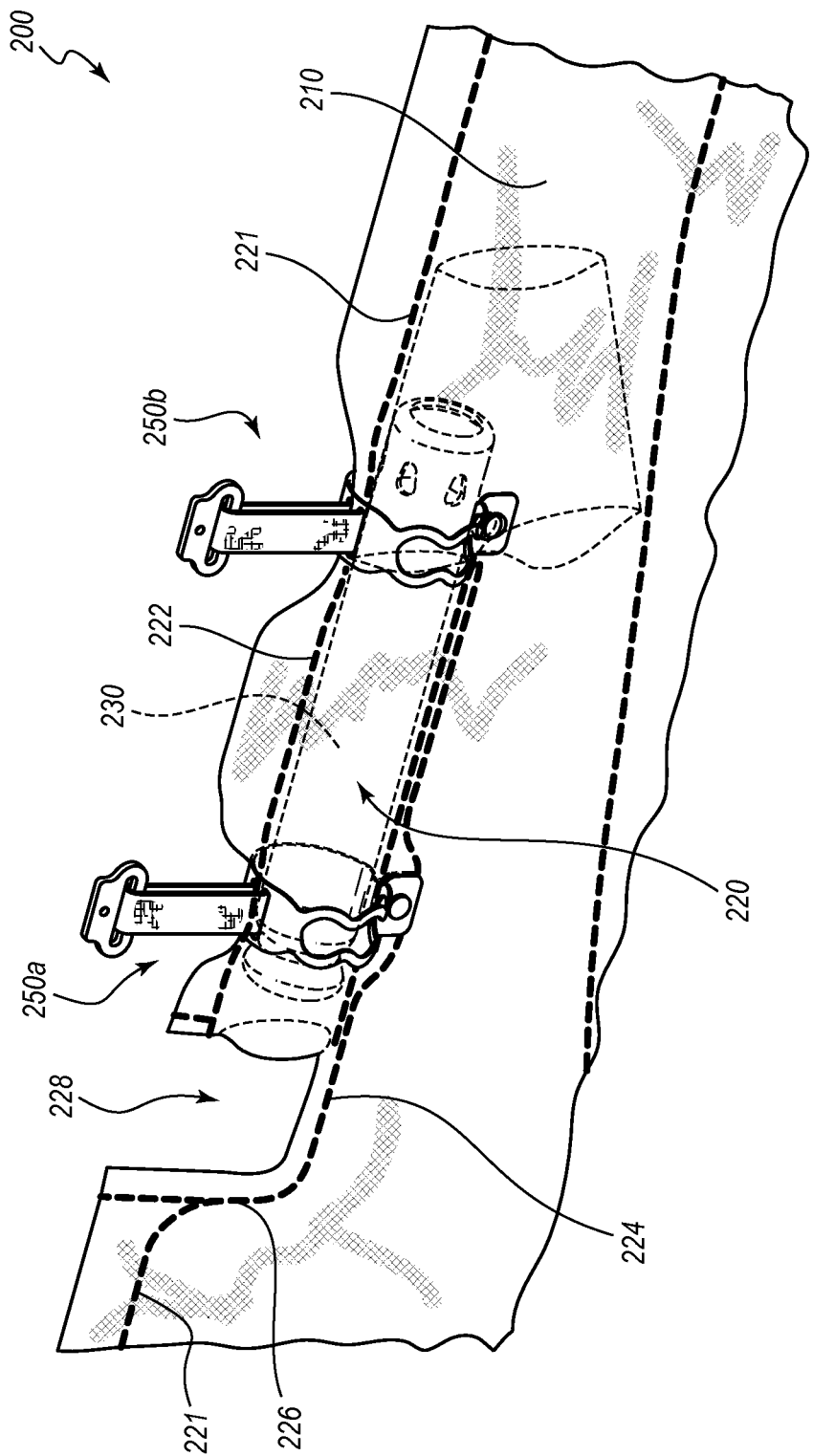
FIG. 5 is a cutaway perspective view of a portion of another embodiment of an inflatable airbag assembly.

FIG. 5 is another embodiment of an inflatable airbag assembly 200 according to the present disclosure. Inflatable curtain airbag assembly 200 can, in certain respects, resemble components of inflatable curtain airbag assembly 100 described in connection with FIGS. 1A-3B above. It will be appreciated that the illustrated embodiments may have analogous features. Accordingly, like features are designated with like reference numerals, with the leading digits incremented to "2." (For instance, first inflatable curtain airbag is designated "110" in FIGS. 1A-3B, and an analogous inflatable curtain airbag is designated as "210" in FIG. 5.) Relevant disclosure set forth above regarding similarly identified features thus may not be repeated hereafter. Moreover, specific features of the inflatable curtain airbag assembly and related components shown in FIG. 5 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the inflatable curtain airbag assembly of FIG. 5. Any suitable combination of the features, and variations of the same, described with respect to the inflatable curtain airbag assembly and components illustrated in FIGS. 1A-3B, can be employed with the inflatable curtain airbag assembly and components of FIG. 5, and vice versa. This pattern of disclosure applies equally to further embodiments depicted in subsequent figures and described hereafter.

FIG. 5 depicts inflatable airbag assembly 200 comprising inflatable curtain airbag 210 and inflator 230. Inflator 230 is positioned at least partially within inflator housing region 220 and is coupled to inflatable curtain airbag 210 via mounting assemblies 250a, 250b. Inflatable housing region 220 is defined by lower seam 224, side seam 226 and upper seam 222, which is portion of outer perimeter seam 221.

In the depicted embodiment, outer perimeter seam 221 is discontinuous at inflatable housing region 220, and inflator insert opening 228 comprises a notched opening through a discontinuous portion of outer perimeter seam 221. In some embodiments, mounting assembly 250a may comprise a support tab or structure that may provide inflatable curtain airbag 210 with added structure support, especially in embodiments wherein outer perimeter seam 221 is discontinuous. The support tab or structure may be used in place of mounting assembly 250a and may be rigidly attached to a vehicle structure.

Figure 6:
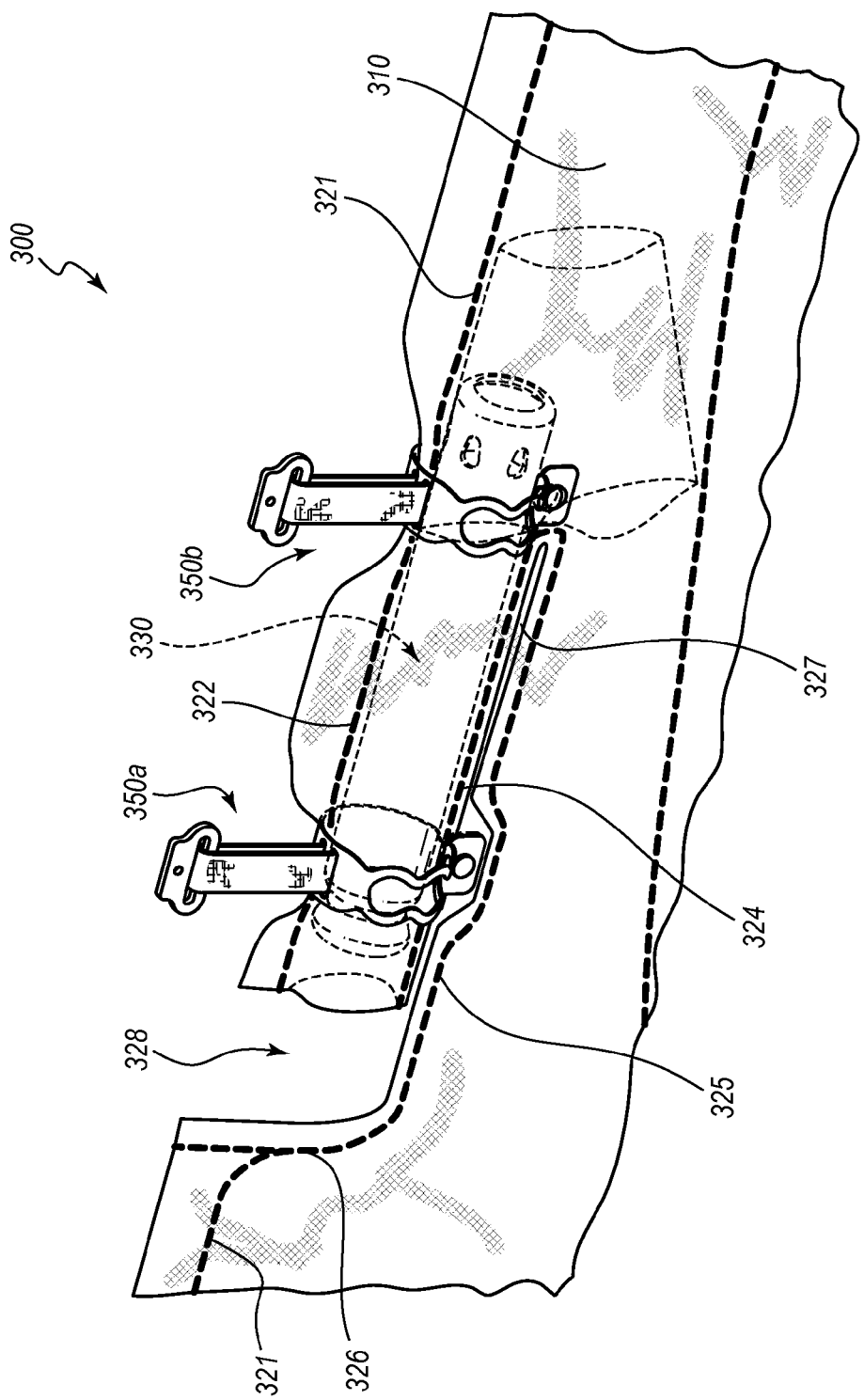
FIG. 6 is a cutaway perspective view of a portion of another embodiment of an inflatable airbag assembly.

FIG. 6 depicts an inflatable airbag assembly 300 comprising inflatable curtain airbag 310 and inflator 330. Inflator 330 is positioned at least partially within inflator housing region 320 and is coupled to inflatable curtain airbag 310 via mounting assemblies 350a, 350b. Inflatable housing region 320 is defined by lower seams 324, 325, side seam 326, and upper seam 322, which is portion of outer perimeter seam 321.

In the depicted embodiment, outer perimeter seam 321 is discontinuous at inflatable housing region 320, and inflator insert opening 328 comprises a notched opening through a discontinuous portion of outer perimeter seam 321. Inflatable curtain airbag 310 further comprises a slit 327 disposed between first lower seam 324 and second lower seam 325 at a location that is inwardly of inflator housing region 320. In some embodiments, slit 327 may allow one or more closed circular clamps (e.g., band-it clamps) to be slid over inflator 330 and inflatable airbag cushion 310. The closed circular clamps may be used to couple inflator 330 and inflatable airbag cushion 310 together.

FIGS. 7A-7B depict cross-sectional end views of an embodiment of a mounting assembly 450 and inflator 430 in a packaged configuration (FIG. 7A) and a deployed configuration (FIG. 7B). For clarity, inflatable curtain airbag is absent or otherwise removed from the embodiment of FIGS. 7A-7B. It will, however, be appreciated that an inflatable curtain airbag may be employed with the depicted embodiment. As shown in FIGS. 7A-7B, mounting assembly 450 may comprise coupling member 452, tether 454, and mounting member 456. Coupling member 452 is closed or wrapped around inflator 430 and is moveable between a first position and a second position.

As depicted in FIG. 7A, inflator 430 may be disposed in the first position when mounting assembly 450 is in the packaged configuration. In the first position, tether 454 may be folded and/or wrapped and inflator 430 may be adjacent to and/or abut mounting member 456. The distance between mounting member 456 and the midpoint of inflator 430 is $L_1$. As can be appreciated, in the first position, there may be minimal distance $L_1$ between inflator 430 and mounting member 456.

As depicted in FIG. 7B, inflator 430 may be disposed in the second position when mounting assembly 450 is in the deployed configuration. In the second position, tether 454 is extended and inflator 430 is spaced away from mounting member 456. The distance between mounting member 456 and the midpoint of inflator 430 is $L_2$. As can be appreciated, in the second position, there is maximal distance $L_2$ between inflator 430 and mounting member 456. Further, inflator 430 is disposed at a distance that is closer to mounting member 456 in the first position than in the second position. In the depicted embodiment, $L_2$ is greater than $L_1$. The length of $L_2$ may vary according to the length of tether 454.

FIGS. 8A-8B depict cross-sectional end views of an embodiment of a mounting assembly 550 and inflator 530 in a packaged configuration (FIG. 8A) and a deployed configuration (FIG. 8B). For clarity, inflatable curtain airbag is absent or otherwise removed from the embodiment of FIGS. 8A-8B. It will, however, be appreciated that an inflatable curtain airbag may be employed with the depicted embodiment. As shown in FIGS. 8A-8B, mounting assembly 550 may comprise coupling member 552, tether 554, and mounting member 556. Coupling member 552 is closed or wrapped around inflator 530 and is moveable between a first position and a second position.

FIGS. 8A-8B further depict a fastener 565 that may be configured and/or used to retain an inflatable airbag assembly in the packaged configuration. For example, FIG. 8A depicts fastener 565 coupling mounting member 556 to coupling member 552 in the packaged configuration. Upon deployment, fastener 565 may be configured to break away into pieces 566, 567, and the inflatable airbag assembly may transition to the deployed configuration of FIG. 8B.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
   an inflatable curtain airbag comprising an inflator housing region that is constrained to a location that is inward and below a portion of an outer perimeter seam of the inflatable curtain airbag, the portion of the outer perimeter seam extending in a substantially horizontal direction along an upper portion of the inflatable curtain airbag when the inflatable curtain airbag is deployed in a vehicle, the horizontal direction being defined with respect to a roofline of the vehicle in which the inflatable airbag assembly is configured to be installed, wherein the inflator housing region comprises an inflator insert opening that is in fluid communication with an inflatable void of the inflatable curtain airbag;
   an inflator positioned at least partially within the inflator housing region; and
   a mounting assembly comprising a coupling member, wherein the coupling member is configured to close around the inflatable curtain airbag after the inflator has been positioned at least partially within the inflator housing region such that the inflator and the inflatable curtain airbag are coupled together.

2. The inflatable airbag assembly of claim 1, wherein the mounting assembly further comprises a tether and a mounting member, wherein the tether extends between the mounting member and the coupling member.

3. The inflatable curtain airbag assembly of claim 2, wherein the inflatable curtain airbag is configured to be disposed in a packaged configuration wherein the inflator is disposed at a first position, and a deployed configuration wherein the inflator is disposed at a second position, wherein the inflator is disposed at a distance that is closer to the mounting member in the first position than in the second position.

4. The inflatable airbag assembly of claim 3, further comprising a fastener, wherein the fastener is configured to couple the mounting member to the coupling member when the inflatable airbag assembly is in the packaged configuration, and wherein the fastener is configured to break away as the inflatable airbag assembly transitions from the packaged configuration to a deployed configuration.

5. The inflatable airbag assembly of claim 1, further comprising a second mounting assembly.

6. The inflatable airbag assembly of claim 1, further comprising a liner that is disposed within the inflatable void of the inflatable curtain airbag, wherein an end of the inflator is positioned within the liner.

7. The inflatable airbag assembly of claim 6, wherein the coupling member is configured to couple the inflator, the liner, and the inflatable curtain airbag together.

8. The inflatable airbag assembly of claim 1, wherein the inflator is not configured to be rigidly attached to a vehicle structure.

9. The inflatable airbag assembly of claim 1, wherein the outer perimeter seam is continuous at the inflator housing region, and the inflator insert opening comprises an aperture that extends through at least one of the faces of the inflatable curtain airbag.

10. The inflatable airbag assembly of claim 1, wherein the outer perimeter seam is discontinuous at the inflator housing region, and the inflator insert opening comprises an opening through a discontinuous portion of the outer perimeter seam.

11. The inflatable airbag assembly of claim 1, wherein the inflator housing region does not protrude outwardly beyond the portion of the outer perimeter seam of the inflatable curtain airbag.

12. The inflatable airbag assembly of claim 1, wherein the inflator is not configured to rigidly attach to a vehicle structure.

13. An inflatable airbag assembly, comprising:
    an inflatable curtain airbag comprising an inflator housing region, wherein the inflator housing region comprises an inflator insert opening that is in fluid communication with an inflatable void of the inflatable curtain airbag;
    an inflator positioned at least partially within the inflator housing region; and
    a mounting assembly comprising a coupling member that is tethered to a mounting member, wherein the mounting member is configured to be rigidly attached to a vehicle structure, and the coupling member is configured to couple the inflator and the inflatable curtain airbag together,
    wherein the inflatable curtain airbag is configured to be disposed in a packaged configuration wherein the inflator is disposed at a first position, and a deployed configuration wherein the inflator is disposed at a second position, wherein the inflator is disposed at a distance that is closer to the mounting member in the first position than in the second position.

14. The inflatable airbag assembly of claim 13, further comprising a fastener, wherein the fastener is configured to couple the mounting member to the coupling member when the inflatable airbag assembly is in the packaged configuration, and wherein the fastener is configured to break away as the inflatable airbag assembly transitions from the packaged configuration to the deployed configuration.

15. The inflatable airbag assembly of claim 13, wherein the inflator insert opening comprises an aperture that extends through at least one of the faces of the inflatable curtain airbag.

16. The inflatable airbag assembly of claim 13, wherein the inflator insert opening comprises an opening through a discontinuous portion of an outer perimeter seam of the inflatable curtain airbag.

17. An inflatable airbag assembly, comprising:
    an inflatable curtain airbag comprising an inflator housing region, wherein the inflator housing region comprises an inflator insert opening that is in fluid communication with an inflatable void of the inflatable curtain airbag;
    an inflator comprising a first end and a second end, wherein the inflator is positioned at least partially within the inflator housing region; and
    a first mounting assembly and second mounting assembly, wherein each mounting assembly comprises a coupling member that is tethered to a mounting member that is configured to be coupled to a vehicle structure,
    wherein the coupling member of the first mounting assembly is configured to couple the inflatable curtain airbag to a first end of the inflator, and the coupling member of the second mounting assembly is configured to couple the inflatable curtain airbag to a second end of the inflator.

18. The inflatable airbag assembly of claim 17, wherein the inflatable curtain airbag is configured to be disposed in a packaged configuration wherein the inflator is disposed at a first position, and a deployed configuration wherein the inflator is disposed at a second position, wherein the inflator is disposed at a distance that is closer to the mounting member of the first mounting assembly in the first position than in the second position.

19. The inflatable airbag assembly of claim 18, further comprising a fastener, wherein the fastener is configured to couple the mounting member of the first mounting assembly to the coupling member of the first mounting assembly when the inflatable airbag assembly is in the packaged configuration, and wherein the fastener is configured to break away as the inflatable airbag assembly transitions from the packaged configuration to the deployed configuration.

20. The inflatable airbag assembly of claim 17, wherein the inflator insert opening comprises an aperture that extends through at least one of the faces of the inflatable curtain airbag.

21. The inflatable airbag assembly of claim 17, wherein the inflator insert opening comprises an opening through a discontinuous portion of an outer perimeter seam of the inflatable curtain airbag.

22. An inflatable airbag assembly, comprising:
   an inflatable curtain airbag comprising an inflator housing region that is constrained to a location that is inwardly of an outer perimeter seam of the inflatable curtain airbag, wherein the inflator housing region comprises an inflator insert opening that is in fluid communication with an inflatable void of the inflatable curtain airbag;
   an inflator positioned at least partially within the inflator housing region;
   a mounting assembly comprising a coupling member, wherein the coupling member is configured to close around the inflatable curtain airbag after the inflator has been positioned at least partially within the inflator housing region such that the inflator and the inflatable curtain airbag are coupled together; and
   a tether and a mounting member, wherein the tether extends between the mounting member and the coupling member.

23. The inflatable curtain airbag assembly of claim 22, wherein the inflatable curtain airbag is configured to be disposed in a packaged configuration wherein the inflator is disposed at a first position, and a deployed configuration wherein the inflator is disposed at a second position, wherein the inflator is disposed at a distance that is closer to the mounting member in the first position than in the second position.

24. The inflatable airbag assembly of claim 23, further comprising a fastener, wherein the fastener is configured to couple the mounting member to the coupling member when the inflatable airbag assembly is in the packaged configuration, and wherein the fastener is configured to break away as the inflatable airbag assembly transitions from the packaged configuration to a deployed configuration.

25. The inflatable airbag assembly of claim 22, wherein the outer perimeter seam is continuous at the inflator housing region, and the inflator insert opening comprises an aperture that extends through at least one of the faces of the inflatable curtain airbag.

26. The inflatable airbag assembly of claim 22, further comprising a second mounting assembly.

27. The inflatable airbag assembly of claim 22, further comprising a liner that is disposed within the inflatable void of the inflatable curtain airbag, wherein an end of the inflator is positioned within the liner.

28. The inflatable airbag assembly of claim 27, wherein the coupling member is configured to couple the inflator, the liner, and the inflatable curtain airbag together.

29. The inflatable airbag assembly of claim 22, wherein the inflator is not configured to be rigidly attached to a vehicle structure.

* * * * *